M. D. MESEROLE.
ANTIRATTLING DEVICE FOR AUTOMOBILE WINDOWS.
APPLICATION FILED OCT. 4, 1920.
1,369,689.
Patented Feb. 22, 1921.
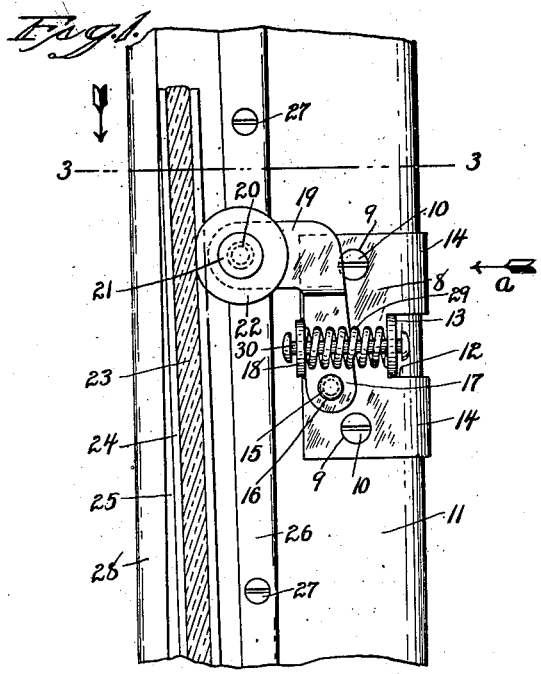
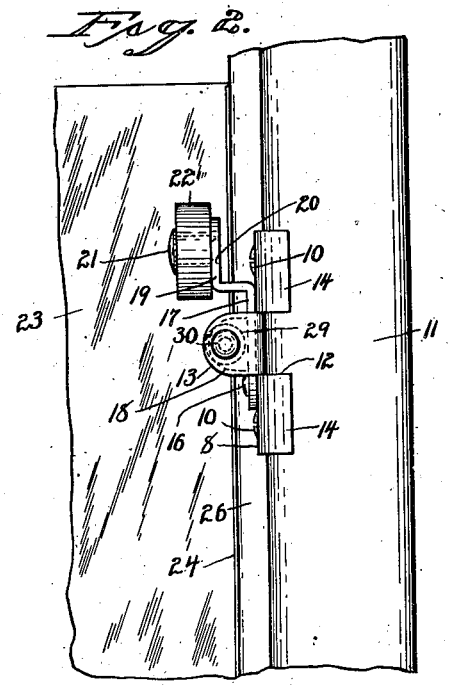
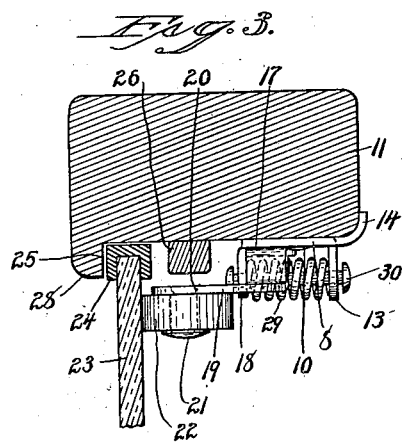
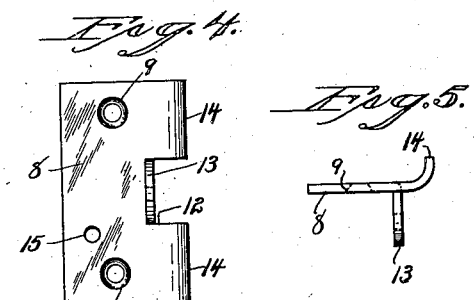
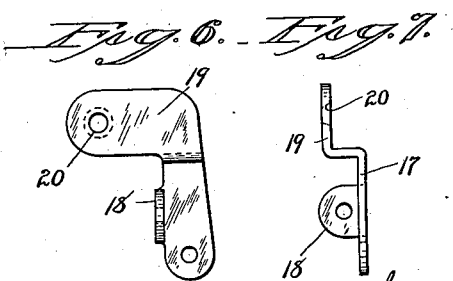
Inventor
Milton D. Meserole
by Seymour Earle
Attys

UNITED STATES PATENT OFFICE.

MILTON D. MESEROLE, OF WEST HAVEN, CONNECTICUT, ASSIGNOR TO THE JAMES F. MOLLOY & CO., OF NEW HAVEN, CONNECTICUT, A CORPORATION.

ANTIRATTLING DEVICE FOR AUTOMOBILE-WINDOWS.

1,369,689.  Specification of Letters Patent.  Patented Feb. 22, 1921.

Application filed October 4, 1920. Serial No. 414,512.

*To all whom it may concern:*

Be it known that I, MILTON D. MESEROLE, a citizen of the United States, residing at West Haven, in the county of New Haven and State of Connecticut, have invented a new and useful Improvement in Antirattling Devices for Automobile-Windows; and I do hereby declare the following, when taken in connection with the accompanying drawings and the characters of reference marked thereon, to be a full, clear, and exact description of the same, and which said drawings constitute part of this application and represent, in—

Figure 1, a broken view in inside elevation of the window casing of an automobile door, the window glass being shown in vertical section and my improved device being shown in side elevation.

Fig. 2, a corresponding view looking in the direction of the arrow *a*.

Fig. 3, a sectional view on the line 3—3 of Fig. 2.

Fig. 4, a detached view in elevation of the mounting-plate.

Fig. 5, a plan view thereof.

Fig. 6, a detached view in elevation of the pivotal roller-carrier.

Fig. 7, an edge view thereof.

My invention relates to an improved antirattling device for automobile windows, the object being to produce a simple, durable and effective device constructed with particular reference to fewness of parts, convenience of application, and attractiveness of appearance.

With these ends in view, my invention consists in certain details of construction and combination of parts, as will be hereinafter described and pointed out in the claims.

In carrying out my invention as herein shown, I employ a mounting-plate 8, having screw-holes 9 for the reception of screws 10 by means of which the plate is secured to the inner face of the window-casing 11 of an automobile door, the outer edge of the plate being formed with a central slot 12 for the production of an integral lug 13 and two retaining-arms 14 which latter are correspondingly curved, and clasp the edge of the casing 11 so as to assist in holding the plate in place and also so as to improve the finish of the job, the said lug and arms being bent in opposite directions. The plate 8 is formed below its vertical center with a hole 15 receiving a pivot 16 mounting a roller-carrier 17, the inner edge of which is formed with an integral lug 18 and the upper end of which merges into an integral offsetting, horizontal arm 19, having in its end a hole 20 receiving a stud 21 mounting a rubber or other equivalent roller 22 which rides upon the inner face of the window glass 23, which, as shown, has applied to its edge a rubber binder 24. The bound edge of the glass has vertical movement and lateral play in a guideway 25 produced by a vertical strip 26 secured to the casing 11 by screws 27 and also by a lip 28 formed upon the outer edge of the casing. For causing the roller 22 to exert a constant yielding pressure upon the glass 23, I employ a horizontally-arranged helical spring 29 encircling a headed guide-pin 30 passing through the lugs 13 and 18, as clearly shown in Fig. 1, the said spring being located directly below the arm 19 which is sufficiently offset from the plane of the carrier 17 to clear the strip 26 and permit the roller 22 to engage directly with the inner face of the glass window 23. The said spring is also located above the pivot 16.

While I have shown and described my improved device as applied to the window casing of an automobile door, it is apparent that it may be used in any situation where it is desired to prevent the rattling of a window glass.

I claim:

1. The combination with a mounting-plate adapted to be secured to a window casing, of a roller-carrier pivoted by its lower end to the said mounting-plate and formed at its upper end with an offsetting horizontally arranged arm, a roller mounted in the said arm, and a spring interposed between the mounting-plate and the said arm at a point below the said roller and exerting a constant effort to hold the same against a window glass.

2. In an anti-rattling device for automobile windows, the combination with a mounting-plate having its outer edge provided with retaining-arms and a lug turned in opposite directions, a roller-carrier pivoted by its lower end to the said plate and provided with a lug and with an offsetting horizontal arm, a roller mounted in the said arm, a guide pin mounted at its ends in the said lugs, and a helical spring interposed between the lugs and encircling the said pin, and exerting a constant effort to hold the roller against a window glass.

In testimony whereof I have signed this specification in the presence of two subscribing witnesses.

MILTON D. MESEROLE.

Witnesses:
LEON M. MOLLOY,
HELEN W. MORAN.